United States Patent
Gonzales et al.

(10) Patent No.: US 6,968,003 B1
(45) Date of Patent: Nov. 22, 2005

(54) SPEED-MEMORY TRADEOFF FOR MPEG DECODERS

(75) Inventors: Cesar Augusto Gonzales, Katonah, NY (US); Elliot Neil Linzer, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/592,977

(22) Filed: Jan. 29, 1996

(51) Int. Cl.[7] ............................................... H04N 7/12
(52) U.S. Cl. ................................................ 375/240
(58) Field of Search ........................ 348/423, 400–402, 348/413, 416, 405, 409, 404, 415; 382/244, 382/245, 246, 247, 238; H04N 7/12

(56) References Cited

U.S. PATENT DOCUMENTS

| | | | | |
|---|---|---|---|---|
| 4,652,935 A | * | 3/1987 | Endoh et al. ................ 358/260 |
| 5,142,283 A | * | 8/1992 | Chevion et al. ............ 341/107 |
| 5,317,397 A | * | 5/1994 | Odaka et al. ................ 348/416 |
| 5,386,234 A | * | 1/1995 | Veltman et al. ............. 348/409 |
| 5,398,072 A | * | 3/1995 | Auld ........................... 348/426 |
| 5,408,270 A | * | 4/1995 | Lim ............................. 348/429 |
| 5,426,464 A | * | 6/1995 | Casavant et al. ........... 348/423 |
| 5,504,530 A | * | 4/1996 | Obikane et al. ............ 348/413 |
| 5,510,787 A | * | 4/1996 | Koster ......................... 341/76 |
| 5,510,840 A | * | 4/1996 | Yonemitsu et al. ......... 348/402 |
| 5,541,594 A | * | 7/1996 | Huang et al. ................ 341/51 |
| 5,574,504 A | * | 11/1996 | Yagasaki et al. ............ 348/413 |
| 5,576,765 A | * | 11/1996 | Cheney et al. .............. 348/416 |
| 5,646,693 A | * | 7/1997 | Cismas ........................ 348/44 |
| 5,647,048 A | * | 7/1997 | Ting et al. ................... 386/68 |
| 5,649,047 A | * | 7/1997 | Takahashi et al. .......... 386/111 |
| 5,841,475 A | * | 11/1998 | Kurihara et al. ............ 348/409 |
| 5,969,768 A | * | 10/1999 | Boyce et al. ................ 348/403 |

FOREIGN PATENT DOCUMENTS

EP      0 710 028 A2    1/1996

* cited by examiner

*Primary Examiner*—Nhon Diep
(74) *Attorney, Agent, or Firm*—Daniel P. Morris

(57) ABSTRACT

A system and method for reducing the memory requirements of a decoding subsystem by decoding some pictures multiple times. In a preferred embodiment a video decoder stores only two decoded frames plus a small fraction of a third decoded frame in memory.

3 Claims, 17 Drawing Sheets

```
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO

XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
XXXXXXXXXXXXXXXXX    XXXXXXXXXXXXXXXXX
OOOOOOOOOOOOOOOOO    OOOOOOOOOOOOOOOOO
```

FIG.3
Prior Art

THIS IS: /a/e

Ⓧ XXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
XXXXXXXXXXXXXXXXXXXXXXXXXXXXXXXX
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0

FIG. 11A yyyyyyyyyyyyyyyyyyyyyyyyyyyyyyyy
yyyyyyyyyyyyyyyyyyyyyyyyyyyyyyyy
yyyyyyyyyyyyyyyyyyyyyyyyyyyyyyyy
yyyyyyyyyyyyyyyyyyyyyyyyyyyyyyyy
⊗xxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxooooooooooooooo
xxxxxxxxxxxxxxxxooooooooooooooo
xxxxxxxxxxxxxxxxooooooooooooooo
xxxxxxxxxxxxxxxxooooooooooooooo
xxxxxxxxxxxxxxxxooooooooooooooo
xxxxxxxxxxxxxxxxooooooooooooooo
xxxxxxxxxxxxxxxxooooooooooooooo
xxxxxxxxxxxxxxxxooooooooooooooo

FIG. 11B

```
ooooooooooooooooyyyyyyyyyyyyyyyy
ooooooooooooooooyyyyyyyyyyyyyyyy
ooooooooooooooooyyyyyyyyyyyyyyyy
ooooooooooooooooyyyyyyyyyyyyyyyy
ooooooooooooooooyyyyyyyyyyyyyyyy
ooooooooooooooooyyyyyyyyyyyyyyyy
ooooooooooooooooyyyyyyyyyyyyyyyy
ooooooooooooooooyyyyyyyyyyyyyyyy
ⓧxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
xxxxxxxxxxxxxxxxxxxxxxxxxxxxxxxx
```

FIG. 11C

```
AAAAAAAABBBBBBBB        AAAAAAAA BBBBBBBBB
AAAAAAAABBBBBBBB        CCCCCCCC DDDDDDDDD
AAAAAAAABBBBBBBB        AAAAAAAA BBBBBBBBB
AAAAAAAABBBBBBBB        CCCCCCCC DDDDDDDDD
AAAAAAAABBBBBBBB        AAAAAAAA BBBBBBBBB
AAAAAAAABBBBBBBB        CCCCCCCC DDDDDDDDD
AAAAAAAABBBBBBBB        AAAAAAAA BBBBBBBBB
AAAAAAAABBBBBBBB        CCCCCCCC DDDDDDDDD
CCCCCCCCDDDDDDDD        AAAAAAAA BBBBBBBBB
CCCCCCCCDDDDDDDD        CCCCCCCC DDDDDDDDD
CCCCCCCCDDDDDDDD        AAAAAAAA BBBBBBBBB
CCCCCCCCDDDDDDDD        CCCCCCCC DDDDDDDDD
CCCCCCCCDDDDDDDD        AAAAAAAA BBBBBBBBB
CCCCCCCCDDDDDDDD        CCCCCCCC DDDDDDDDD
CCCCCCCCDDDDDDDD        AAAAAAAA BBBBBBBBB
CCCCCCCCDDDDDDDD        CCCCCCCC DDDDDDDDD
```

```
EEEEEEEE                EEEEEEEE
EEEEEEEE                FFFFFFFF
EEEEEEEE                EEEEEEEE
EEEEEEEE                FFFFFFFF
EEEEEEEE                EEEEEEEE
EEEEEEEE                FFFFFFFF
EEEEEEEE                EEEEEEEE
EEEEEEEE                FFFFFFFF
FFFFFFFF                EEEEEEEE
FFFFFFFF                FFFFFFFF
FFFFFFFF                EEEEEEEE
FFFFFFFF                FFFFFFFF
FFFFFFFF                EEEEEEEE
FFFFFFFF                FFFFFFFF
FFFFFFFF                EEEEEEEE
FFFFFFFF                FFFFFFFF
```

SPEED-MEMORY TRADEOFF FOR MPEG DECODERS

I. BACKGROUND OF THE INVENTION a. Field of the Invention

The present invention relates to the field of data compression and, more particularly, to a system and techniques for decompressing digital motion video signals.

b. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

Video decoders are typically embodied as general or special purpose processors and memory. For a conventional MPEG-2 decoder, three or more decoded frames are typically stored in memory at the same time. Thus, the cost of memory often dominates the cost of the decoding subsystem.

II. SUMMARY OF THE INVENTION

The present invention reduces the memory requirements of a decoding subsystem by decoding some pictures multiple times. Both a system and method are provided. In accordance with the method, a picture in a sequence is decoded a first time. Responsive to the first decoding, a first portion of the picture is provided to a display. The picture is also decoded a second time. Responsive the to second decoding, a second portion of the picture is provided to the display. In a preferred embodiment a video decoder stores only two decoded frames plus a small fraction of a third decoded frame in memory. Advantageously, the present invention can be implemented in a decoder suitable for use with the ISO/IEC MPEG-2 standard.

III. BRIEF DESCRIPTION OF THE DRAWINGS

FIG. 3 shows an exemplary macroblock subdivision of a 32×32 frame encoded as a frame-structured picture;

FIGS. 11a, 11b and 11c show an example of memory management in the method of FIG. 8 and the decoder of FIG. 13;

FIGS. 12a, 12b, 12c and 12d show exemplary partitioning of a macroblock in frame and field modes;

IV. DETAILED DESCRIPTION OF THE PREFERRED EMBODIMENTS a. The MPEG-2 Environment

As the present invention may be applied in connection with an MPEG-2 decoder, in order to facilitate the understanding of the invention, some pertinent aspects of the MPEG-2 compression algorithm will be reviewed. It is to be noted, however, that the invention can also be applied to other video coding algorithms which share some of the features of the MPEG-2 algorithm.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or noninterlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
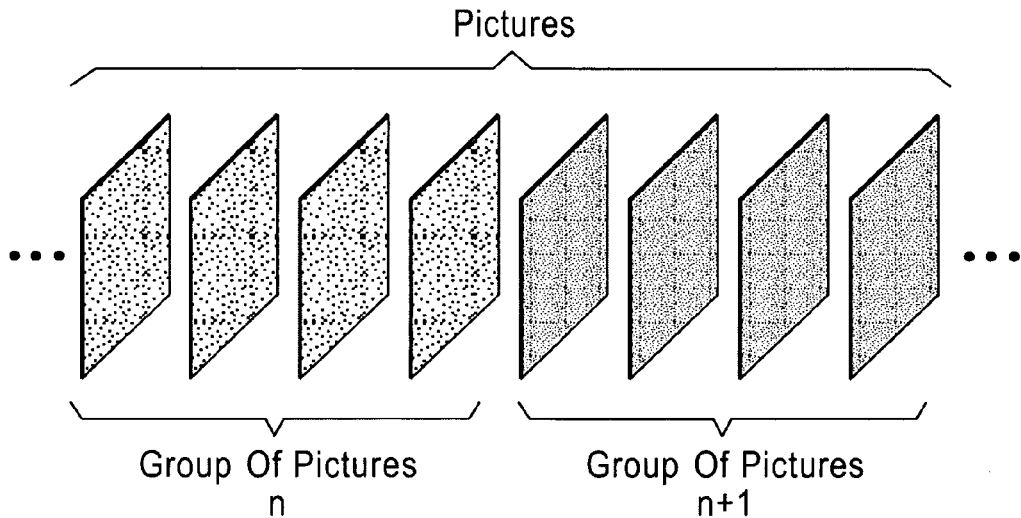
FIG. 1 shows an exemplary pair of Groups of Pictures (GOP's)
Figure 2:
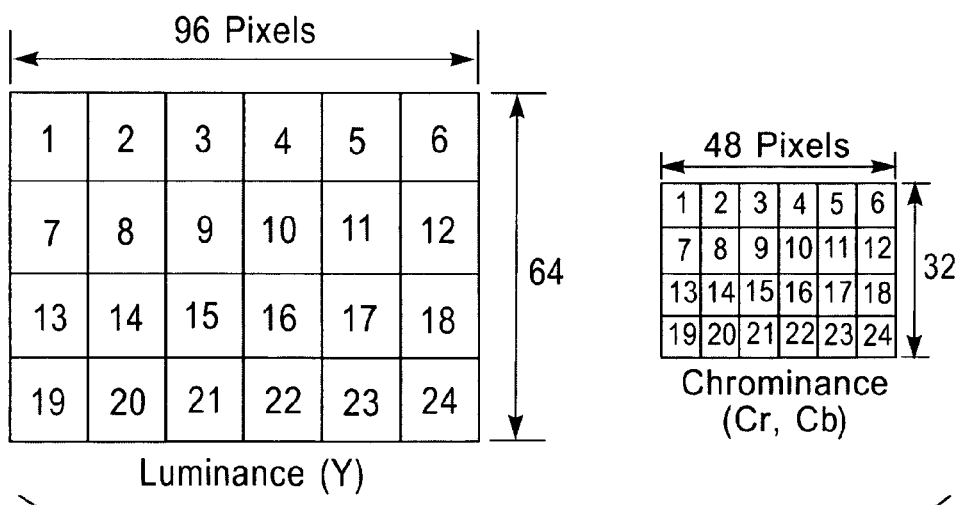
FIG. 2 shows an exemplary macroblock (MB) subdivision of a picture (for 4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1–2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field and we may also call the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

In FIG. 3, we have drawn the macroblock partitioning in a 32×32 frame encoded as a frame-structured picture. In this figure, we have drawn pixels in the top field as x's and pixels in the bottom field as o's. Note that each of the macroblocks contains a 16×8 region from each field.

Figure 4A:
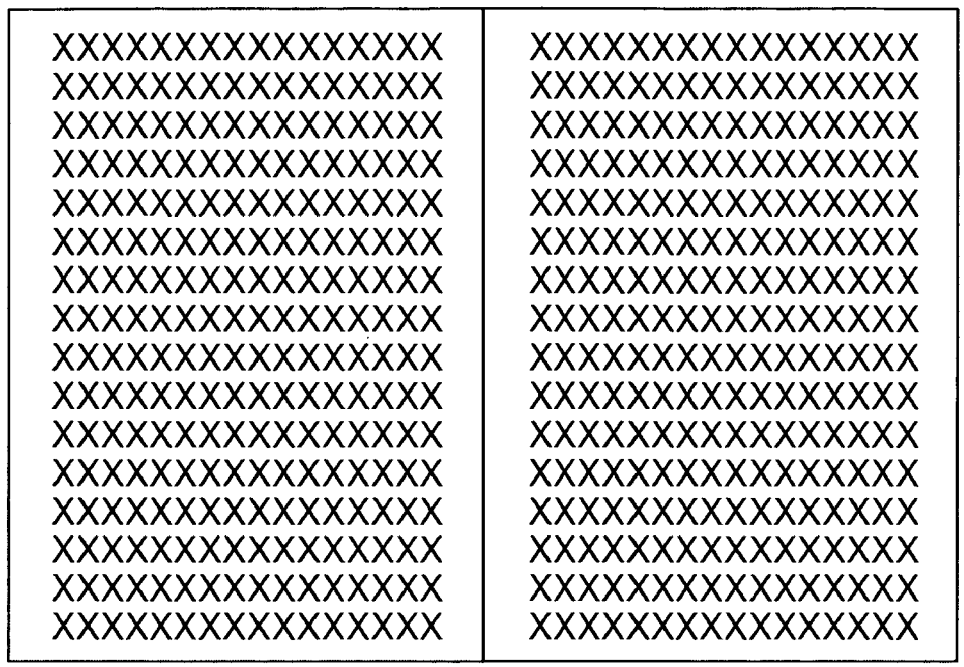
FIGS. 4a and 4b show an exemplary macroblock subdivision of a 32×32 frame encoded as two field-structured pictures.
Figure 4B:

In FIGS. 4a and 4b, we have drawn the macroblock partitioning in a 32×32 frame encoded as two field-structured pictures. We have again drawn pixels in the top field as x's and pixels in the bottom field as o's. In FIG. 4a, we have drawn the top field picture; each macroblock is an array of 16×16 pixels from the top field. In FIG. 4b, we have drawn the bottom field picture; each macroblock is an array of 16×16 pixels from the bottom field. Note that these pictures are encoded in display order; if the top field is to be displayed first, than the picture associated with the top field will appear in the bit stream first, and if the bottom field is to be displayed first, than the picture associated with the bottom field will appear in the bit stream first.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as a I pictures, the first field can be coded as an I picture and the second field as P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

The picture coding type (I, P or B) as well as well as the picture structure (field-structured or frame-structured) are contained in the header information that begins a coded picture. For a field-structured picture, the header indicates whether the picture is a top field or a bottom field; in the first case, the decoder displays the decoded field as the top set of lines, and in the latter case as the bottom set. For frame structure pictures, the header specifies whether the frame is "top field first". If it is, the top field is displayed first, and if it is not, the top field is displayed second. Referring to FIG. 3, the "x's" will be displayed first if the frame is top field first, and the "o's" will be displayed first otherwise. As mentioned, for a frame encoded as two field-structured pictures the decoder knows which field to display first by the order that the fields are encoded; if the top field is encoded first it is displayed first, and if the bottom field is encoded first it is displayed first. The header also contains a bit "repeat_first_field". For field-structured pictures, this bit is always set to zero. For frame-structured pictures, it may be set to one; in that case, the first field is displayed both before and after the second field.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantising the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The partitioning of a macroblock into 8×8 blocks for the DCT is done adaptively in frame-structured pictures and non-adaptively in field-structured pictures. In a frame-structured pictures, each macroblock can be partitioned in "frame" mode or in "field" mode. We refer to this as the "coding mode" of the macroblock.

In FIGS. 12a–d, we illustrate the macroblock partitioning of pixels in frame-structured pictures. In FIG. 12a, we have illustrated the partitioning of the luminance pixels in frame mode; the 16×16 block of luminance pixels is divided into four 8×8 blocks: block A is the upper-left block, block B is the upper right block, block C is the lower left block and block D is the lower right block. In FIG. 12b, we have illustrated the partitioning of the luminance pixels in field mode; the 16×16 block of luminance pixels is divided into four 8×8 blocks: block A is the top-field left block, block B is the top-field right block, block C is the bottom-field left block and block D is the bottom-field right block. For 4:2:0 data, the chrominance components of each macroblock are 8×8 and are therefore partitioned non-adaptively. (Note that this means that even if field coding mode is used that each chrominance block will have data from both fields for 4:2:0 data). In 4:4:4 mode the chrominance components of each macroblock are 16×16 and are partitioned in the same way as the luminance component. In FIG. 12c, we have illustrated the partitioning of the chrominance pixels in frame mode; each 16×8 block of chrominance pixels is divided into two 8×8 blocks: block E is the upper block and block F is the lower block. In FIG. 12d, we have illustrated the partitioning of the chrominance pixels in field mode; each 16×8 block of chrominance pixels is divided into two 8×8 blocks: block E is the top-field block and block F is the bottom-field block.

In field-structured pictures, the luminance data is always partitioned as in FIG. 12a. For 4:2:2 data, the chrominance data is always partitioned as in FIG. 12c, and for 4:4:4 data chrominance data is always partitioned as in FIG. 12a.

The second step, quantisation of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantisation is achieved by dividing each DCT coefficient cmn by wmn times QP, with wmn being a weighting factor and QP being the quantiser parameter. The weighting factor wmn allows coarser quantisation to be applied to the less visually significant coefficients. The quantiser parameter QP is the primary means of trading off quality vs. bit-rate in MPEG-2. It is important to note that QP can vary from MB to MB within a picture.

Following quantisation, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is "motion compensation". MPEG-2 provides tools for several methods of motion compensation (described below).

Many methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used. We refer to the combination of macroblock mode an motion compensation mode used by a macroblock as the motion compensation "method"; there are seven such methods in MPEG-2: F/S, B/S, FB/S, F/E, B/E, FB/E and F/D. These methods will all be described below.

A macroblock in any picture can be compressed with I macroblock mode. This is the only macroblock mode available in an I picture, and does not use motion compensation.

F macroblock mode can be used in a P or B picture but not in an I picture. When F macroblock mode is used, the predictive macroblock is formed from the most recently decoded top and bottom fields from reference pictures that are to be displayed before the current picture (the previous reference frame). Note that when field pictures are used, the previous frame may consists of two fields that are not displayed consecutively; if a frame is being compressed as two field-structured P pictures, then the previous frame used for the second field is the first field of the current frame and the last decoded field of opposite parity from the last reference picture, so there may be many B pictures in between the two fields of the previous frame.

B or FB macroblock mode can be used in a B picture but not in I or P pictures. When B macroblock mode is used, the predictive macroblock is formed from the two most recently decoded reference fields that are to be displayed after the current picture (the future reference frame). When FB macroblock mode is used, the predictive macroblock is formed from the future reference frame and the previous reference frame.

The method of motion compensation that uses F macroblock mode and S motion compensation mode (F/S) can be described as follows. The encoder sends a single vector in the bit stream. In a frame-structured picture, this vector is used to generate a set of indices in the previous frame, and the predictive macroblock is the 16×16 region located at those indices. In a field-structured picture, the vector is used to generate a set of indices in one of the fields from the previous frame, and the predictive macroblock is the 16×16 region located at those indices. The encoder sends one bit to indicate which of the fields in the previous frame should be used to generate the predictive macroblock.

The B/S method of motion compensation is the same as the F/S method, except that the future frame, rather than the previous frame, is used in generating the predictive macroblock.

The method of motion compensation that uses F macroblock mode and E motion compensation mode (F/E) can be described as follows. The encoder sends two vectors in the bit stream. Each vector is used to form a 16×8 array of pixels from one of the fields in the previous frame. Two bits are sent to indicate which field of the current frame is to be used with each vector. In a frame-structured picture, the predictive macroblock is formed by interleaving these two arrays; the first array provides the even lines of the predictive macroblock and the second array provides the odd lines. (Each array is used for different fields in the predictive macroblock). In a field-structured picture, the first array is used for the first eight lines of the predictive macroblock and the second array is used for the last eight lines.

The B/E method of motion compensation is the same as the F/E method, except that the future frame, rather than the previous frame, is used in generating the predictive macroblock.

The F/D method can only be used in P pictures, and only if there are no B pictures that are displayed in between the current picture and either field of the previous frame. For the F/D method, the encoder sends two vectors, a same-parity vector and a delta vector. These vectors are used to generate two macroblocks which are then averaged to form the predictive macroblock.

In field-structured pictures, the first macroblock is obtained by using the same-parity vector to construct a macroblock from the same-parity field (i.e., from the top field if the current picture is the top field of a frame or the bottom field if the current in the picture is a bottom field) in the same way that a vector is used to construct the predictive macroblock for the F/S method. A second vector is then obtained from the same-parity vector and the delta vector with rules described in the MPEG-2 standard. This second vector is used to construct the second macroblock from the other field (the off-parity) field in the previous frame in the same way that a vector is used to construct the predictive macroblock for the F/S method. In frame-structured pictures, each macroblock that is used (in averaging) to obtain the predictive macroblock for the F/D method is obtained in the following manner. Two vectors are used to construct each macroblock in the same way that two vector are used to construct the predictive macroblock for the F/E method.

The data used to construct the first macroblock comes from the top field of the previous frame, and the data used to construct the second macroblock comes from the bottom field of the previous frame. The first vector used for the first macroblock is the same-parity vector, and the second vector is derived from the same parity vector and the delta vector. The first vector used for the second macroblock is derived from the same parity vector and the delta vector, and the second vector is the same-parity vector.

The FB/S method of motion compensation works as follows. The encoder sends two motion vectors, a forward vector and a backward vector. The forward vector is used to construct a macroblock from the previous frame the same way a vector is used to form the predictive macroblock for the F/S method of motion compensation, and the backward vector is used to construct a macroblock from the future frame the same way a vector is used to form the predictive macroblock for the B/S method of motion compensation. These two macroblocks are averaged to form the predictive macroblock.

The FB/E method of motion compensation works as follows. The encoder sends four motion vectors, two forward vectors and two backward vectors. The forward vectors are used to construct a macroblock from the previous frame the same way two vectors are used to form the predictive macroblock for the F/E method of motion compensation, and the backward vectors are used to construct a macroblock from the future frame the same way two vectors are used to form the predictive macroblock for the B/E method of motion compensation. These two macroblocks are averaged to form the predictive macroblock.

The vectors sent for any mode of motion compensation can be in half-pixel units. In the case of the F/S, F/E, B/S and B/E methods of motion compensation, spatial interpolation is used to generate the predictive macroblock when the vectors used are in half-pixel units. In the case of the FB/S, FB/E and F/D methods, spatial interpolation is used to generate the macroblocks that are averaged to make the predictive macroblock when the vectors used are in half-pixel units.

Aside from the need to code side information relating to the MB mode used to code each MB and any motion vectors associated with that mode, the coding of motion-compensated macroblocks is very similar to that of intramode MBs. Although there is a small difference in the quantisation, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 5:
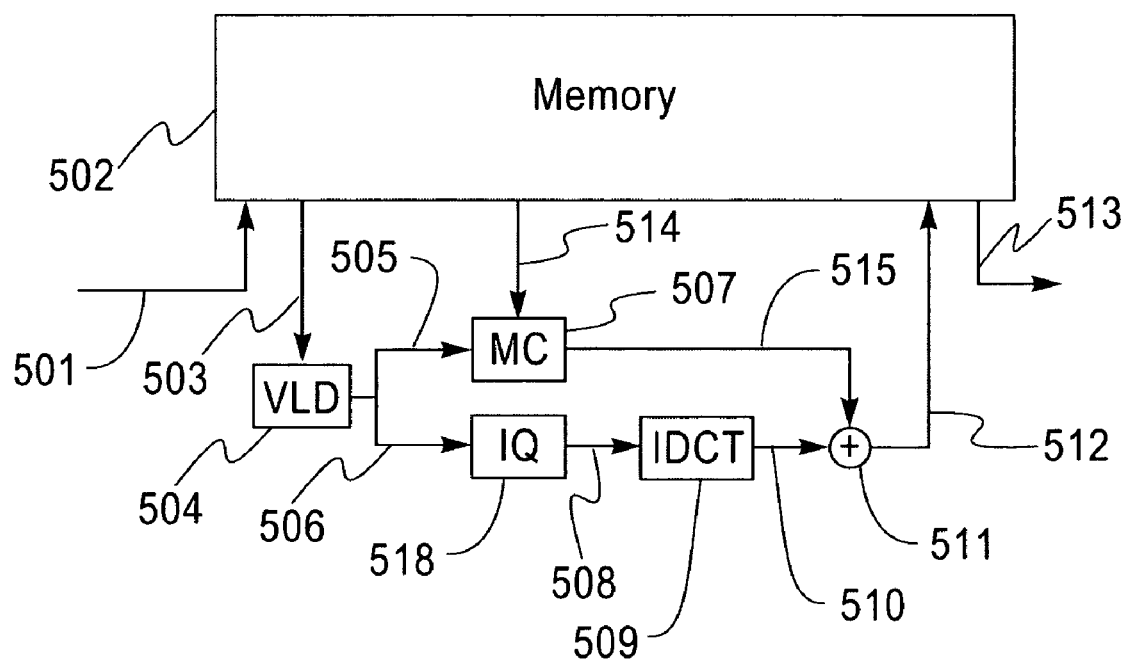
FIG. 5 is a block diagram of a conventional decoder.

In FIG. 5, we have drawn a diagram of a conventional video decoder. Compressed data is read as signal 501 into the memory unit 502. The compressed data is then read from memory as signal 503 to the variable length decoder unit 504. The variable length decoder unit sends the motion compensation information as signal 505 to the motion compensation unit 507. The motion compensation unit reads the reference data from the memory unit 502 as signal 514 to form the predicted macroblock, which is sent as the signal 515 to the adder 511. The variable length decoder unit also sends quantised coefficients and quantisation_scale as signal 506 to the inverse quantisation unit 518, which computes the unquantised coefficients. These coefficients are sent as signal 508 to the inverse transform unit 509. The inverse transform unit computes the reconstructed difference macroblock as the inverse transform of the unquantised coefficients. The reconstructed difference macroblock is sent as signal 510 to the adder 511, where it is added to the predicted macroblock. The adder 511 computes the reconstructed macroblock as the sum of the reconstructed difference macroblock and the predicted macroblock. The reconstructed macroblock is then stored to the memory unit 502 as the signal 512. Finally, reconstructed data is read out as from the memory unit 502 as the signal 513.

Figure 6:
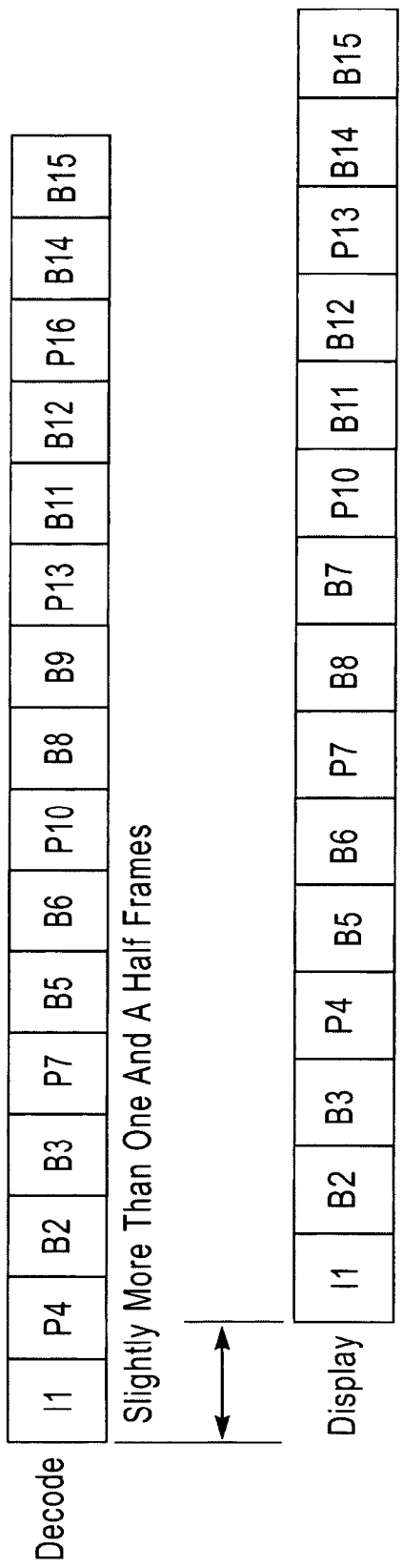
FIG. 6 is a timing diagram for a conventional decoder.

In FIG. 6, we have shown the timing relationship between decoding and displaying frames in a conventional decoder. After more than half of the second coded reference frame has been decoded, display of the first reference frame begins. Thereafter, the frames are displayed periodically. Note that display of a reference frame begins after about half of the next reference frame has been decoded. Display of a B frame begins after about half of the B frame has been decode. If the B frame is encoded as two field-structured pictures, then each field is fully decoded and then displayed. If the B frame is encoded as a frame-structured picture, then only part (about half) of the first field is decoded before display of the first field begins; however, the decoding of the picture ends before the end of first field needs to be displayed. In this case, the second field is decoded completely before the display of the second field begins.

If a picture is decoded for which repeat_first_field=1, the decoder can stop decoding for one field period when the first field is displayed for a second time.

Figure 7:
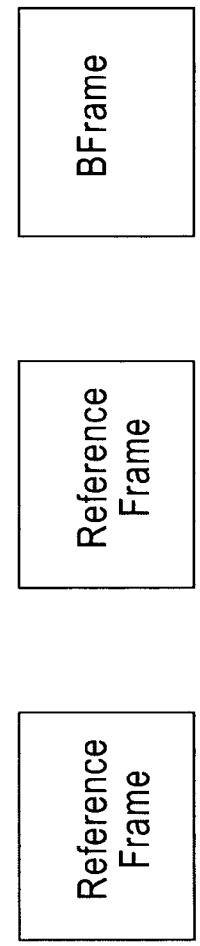
FIG. 7 shows the memory allocation of decoded data for a conventional decoder.

The memory allocation for a standard MPEG-2 decoder is shown in FIG. 7. Two frame's worth of memory are reserved for reference frames and slightly more than one frame's worth of memory is reserved for B frames. When a reference frame is decoded, it is written over the oldest of the two reference frames in memory. Note that this oldest reference frame is no longer needed to reconstruct other pictures and that it has already been displayed.

The memory allocated for B frames is slightly larger than the amount needed to store one frame. When a B frame is decoded, the beginning of the frame is stored in memory not used by the last B frame. The remainder of the B frame is written in memory used by the last B frame. By reference to FIG. 6, we can see that with this scheme no data is overwritten before it is displayed, and all data is decoded before it needs to be displayed.

b. Prefered Embodiment of a Decoder

A decoding method in accordance with the principles of the present invention can be described as follows. Reference pictures and field-structured B pictures are decoded once. A frame-structured B with repeat_first_field=0 is decoded twice, and a frame-structured B with repeat_first_field=1 is decoded three times. The display of a B picture begins just after the decode of that picture has begun. The display of a reference frame begins just after the decode of the next reference has begun. The first time that a frame-structured B is decoded, only the first field is stored to memory. The second time that a frame-structured B is decoded, only the second field is stored to memory. The third time that a frame-structured B is decoded (if repeat_first_field=1), only the first field is stored to memory. With this method, only a small fraction of the B frame has to be in memory at any given time, thus reducing the amount of memory needed by the decoder. It is noted, however, that because each frame-structured B picture is decoded multiple times that the decoder must function about twice as fast as a conventional decoder.

An overview of a decoding method in accordance with the principles of the present invention will be described by reference to FIG. 8. In step 801, a picture header is read. In step 802, the coding type of the picture is checked. If it is not a B frame, control moves to step 803, where the frame (two field-structured or one frame-structured picture) is decoded and stored to memory. Shortly after the decode of this frame begins, the display of the most recently decoded reference frame will begin. After a reference frame is decoded, control returns to step 801. If the picture header in step 801 shows that the picture is a B picture, then control goes to step 804, which checks if the B frame is coded as two field-structured or one frame-structured picture. If it is coded as two field-structured pictures, control moves to step 805, where each field is decoded once and stored to the B memory. When a B picture is being decoded in step 805, the decoding stops if storing a macroblock to the memory would overwrite pixels that have not yet been displayed. Once the display moves far enough along that storing the next macroblock to memory will not overwrite pixels that have not yet been displayed, decoding resumes. After both field-structured B pictures in the B frame have been decoded in step 805, control returns to step 801. If in step 804 it was found that the B frame was encoded as a frame-structured picture, control moves to step 806, where repeat_first_field for the frame is checked. If repeat_first_field=1, the variable n_dec is set to 3 in step 808; otherwise, the variable n_dec is set to 2 in step 807. (The variable n_dec is equal to the number of times the picture will be decoded.) In either event, control then moves to step 809, where a variable n is set to zero. After step 809, control moves to step 810, where the variable n is incremented. After step 810, control moves to step 811, where top_field_first for the B frame being decoded is examined. If top_field_first=1, control moves to step 813; otherwise, control moves to step 812. In step 812, the variable n is examined; if n=2, the variable F is set to "top" in step 814; otherwise, the variable F is set to "bottom" in step 815. In step 813, the variable n is examined; if n=2, the variable F is set to "bottom" in step 815; otherwise, the variable F is set to "top" in step 814. After either step 814 or 815, control goes to step 816, where the B frame is decoded. As in step 805, the decoding stops if storing a macroblock to the memory would overwrite pixels that have not yet been displayed. Once the display moves far enough along that storing the next macroblock to memory will not overwrite pixels that have not yet been displayed, decoding resumes. After the B frame has been decoded, control moves to step 817, which checks if the variable n is equal to the variable n_dec. If it is, control returns to step 801; otherwise, control returns to step 810.

Figure 13:
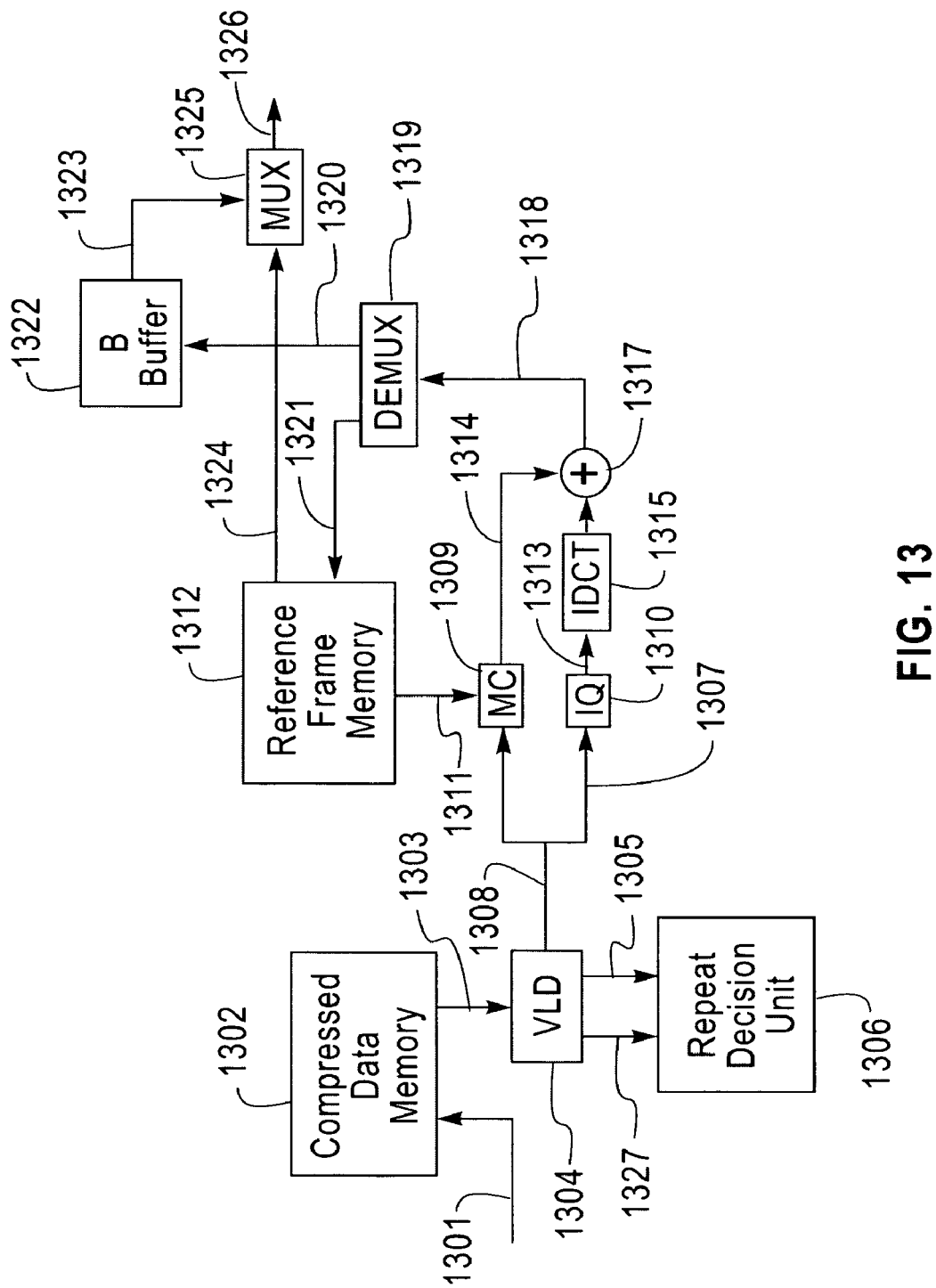
FIG. 13 is a block diagram of a decoder according to an embodiment of the current invention.

A block diagram of a decoder according to an embodiment of this invention is shown in FIG. 13. The compressed data enters as signal 1301 and is stored in the compressed data memory 1302. The variable length decoder 1304 reads the compressed data as signal 1303 and sends motion compensation information as signal 1308 to the motion compensation unit 1309 and quantised coefficients as signal 1307 to the inverse quantisation unit 1310. The variable length decoder also send as signal 1305 information about the picture coding types and picture structures for each picture to the repeat decision unit 1306. With this information, the repeat decision unit decides how many times each picture should be decoded. In particular, each I or P picture is decoded once, each field-structured B picture is decoded once, each frame-structured B picture with repeat_first_field=0 is decoded two times, and each frame-structured B picture with repeat_first_field= 1 is decoded three times. The motion compensation unit reads the reference data from the reference frame memory 1312 as signal 1311 to form the predicted macroblock, which is sent as the signal 1314 to the adder 1317. The inverse quantisation unit computes the unquantised coefficients, which are sent as signal 1313 to the inverse transform unit 1315. The inverse transform unit computes the reconstructed difference macroblock as the inverse transform of the unquantised coefficients. The reconstructed difference macroblock is sent as signal 1316 to the adder 1317, where it is added to the predicted macroblock. The adder 1317 computes the reconstructed macroblock as the sum of the reconstructed difference macroblock and the predicted macroblock. The reconstructed macroblock is then sent as signal 1318 to the demultiplexor 1319, which stores the reconstructed macroblock as signal 1321 to the reference memory if the macroblock comes from a reference picture or as signal 1320 to the B buffer 1322 if the macroblock comes from a B picture. The output multiplexor 1325 sends the output pixels out for display as signal 1326 by reading pixels from the B buffer as signal 1323 to display a B frame and by reading pixels from the reference frame memory as signal 1324 during display of a reference frame. The compress data memory, reference frame memory and B buffer may be embodied as separate data structures instantiated in a single semiconductor memory.

Figure 9:
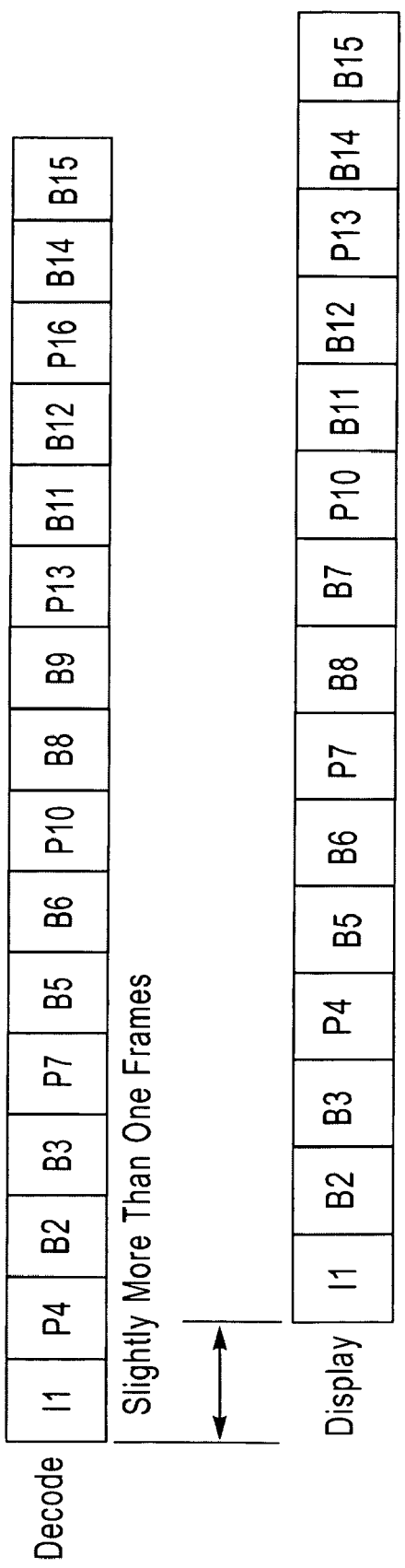
FIG. 9 is a timing diagram for the method of FIG. 8 and the decoder of FIG. 13.

In FIG. 9, we have drawn the timing relationship between displaying and decoding frames in accordance with the principles of the present invention. Note that the display of a reference frame begins just after the decoding of the next reference frame begins, and the display of a B frame begins just after the decoding of that B frame.

Figure 10:
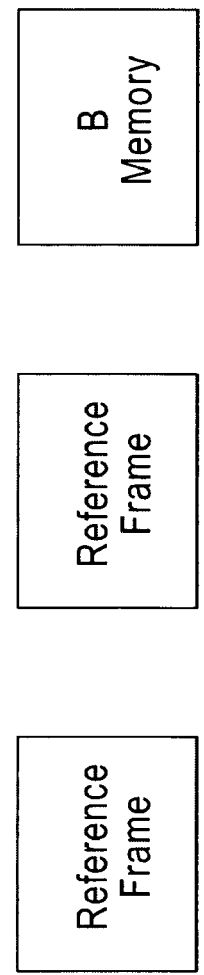
FIG. 10 shows the memory allocation of decoded data for the method of FIG. 8 and the decoder of FIG. 13.

In FIG. 10, we have drawn the memory allocation in accordance with the principles of the present invention. Note that while two reference frames are stored, only a several lines from B pictures are stored.

The method used for storing only a small fraction of the B frame in memory can be understood in more detail by reference to FIGS. 11a–11c. For these figures, we have used as an example a frame width of 32. We have also assumed that the amount of memory used is equal to 48 lines of data (no matter how many lines are in each frame). In all of these figures, we have drawn a 32×48 array of pixels. Pixels designated by x's are pixels that have been written to memory but not yet read by the display. The o's represent the macroblock that the decoder is writing to memory. The 'y's represent pixels that are not in use. The circled pixel is the pixel being read.

In FIG. 11a, we have drawn the case where the 16 lines worth of data have been decoded but not yet displayed. The decoder is writing in a macroblock that consists of 16 columns of the next 8 lines. In FIG. 11b, 4 lines have been displayed and the macroblock that was being written in FIG. 11b has now been fully written in; the decoder is in the process of writing the next macroblock. By FIG. 11c, four more lines have now been read by the display, so the decoder can overwrite these lines with a new macroblock.

Figure 8:
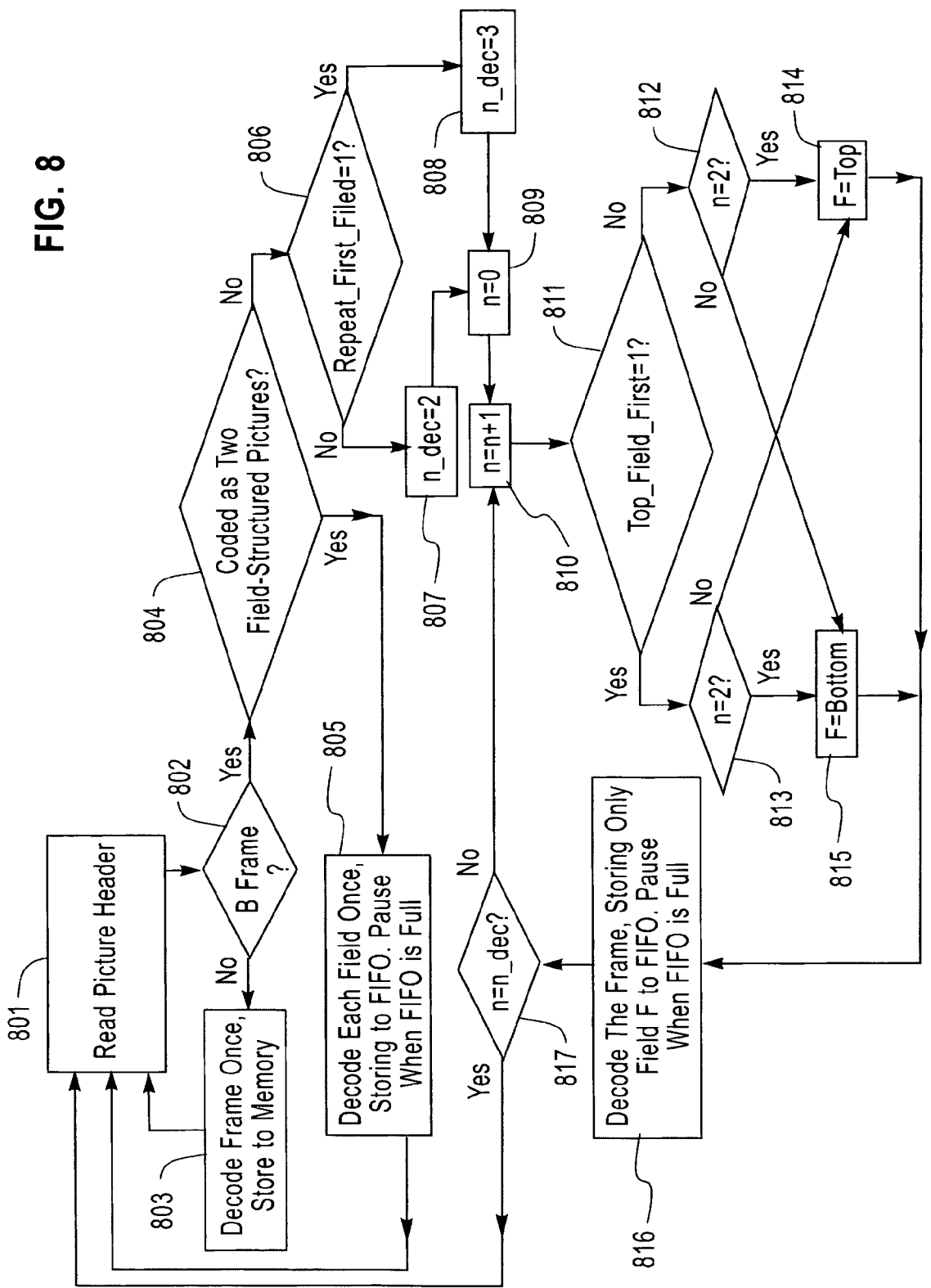
FIG. 8 is a flow chart of a decoding method in accordance with the principles of the present invention.

The decoding method described in FIG. 8 uses conventional methods for decoding each picture, but the timing relationship between decoding and displaying differs from conventional decoding methods, the number of times each frame-structured B pictures is decoded differs from conventional methods, and the amount of memory used for B pictures differs from conventional methods. Because when a frame-structured B picture is decoded with the method of FIG. 8 only one field (field F, where F=top or F=bottom) is stored to memory and the other field is discarded, we can use non-conventional methods for decoding frame-structured B pictures when the method of FIG. 8 is used. (That is, we can use non-conventional decoding methods for step 816.)

Figure 14:
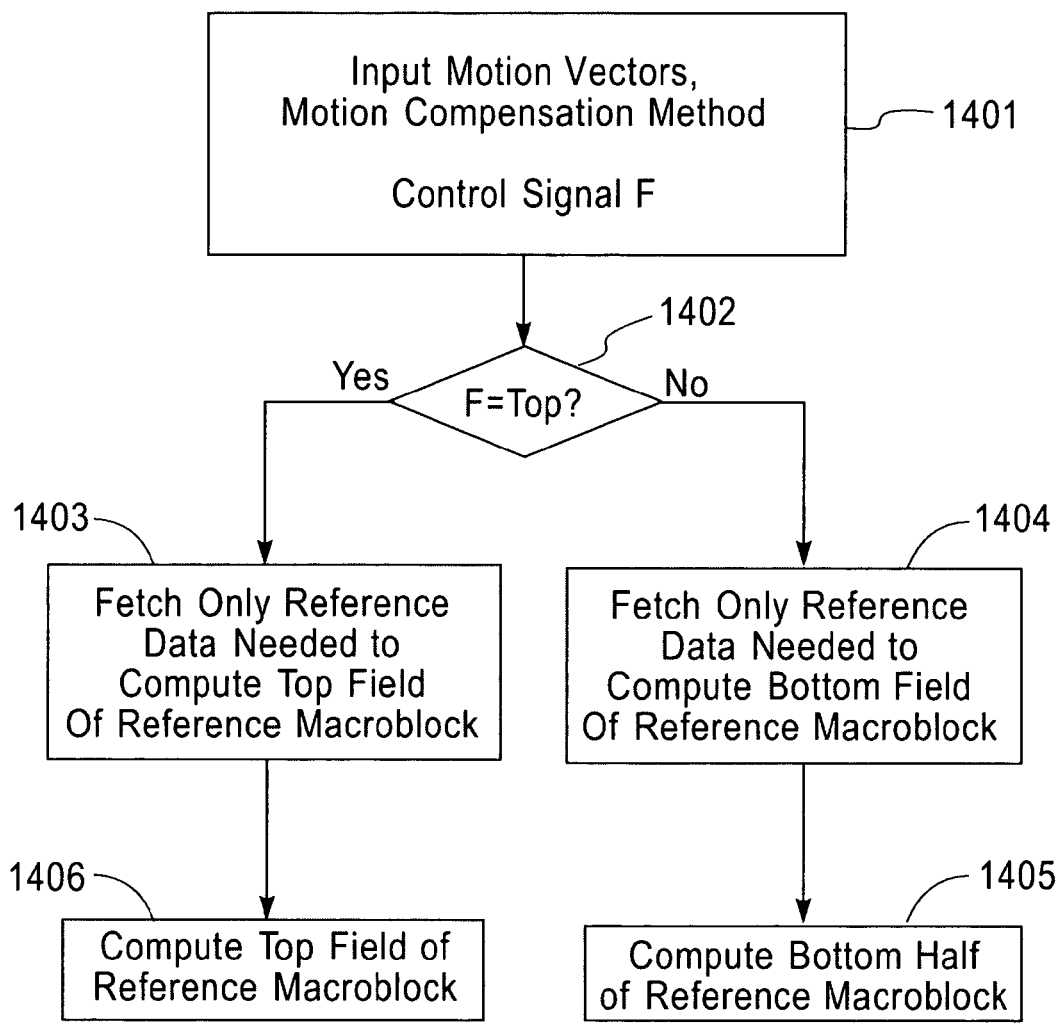
FIG. 14 is a flow chart of motion compensation in the decoder of FIG. 13.

In FIG. 14, we have drawn a flow chart for a method for performing motion compensation on macroblocks in frame-structured B pictures when the decoding method of FIG. 8 is used. In step 1401, the motion vectors and motion compensation method (i.e. data identifying the motion compensation method for the macroblock) are input, as is a control variable F. The control variable F is equal to "top" if the top field is being stored to memory, and it is equal to "bottom" if a bottom field is being stored. After step 1401, control goes to step 1402, which checks if F=top. If it does, control moves to step 1403, where reference data needed to compute the top field of the reference macroblock is fetched. After step 1403, the top field of the predicted macroblock is computed in step 1406. If in step 1402 it was found the F was not equal to top, control moves to step 1404, where reference data needed to compute the bottom field of the reference macroblock is fetched. After step 1404, the bottom field of the predicted macroblock is computed in step 1405. We call this method of motion compensation the pruned method of motion compensation. It is noted that the pruned method of motion compensation requires significantly less memory bandwidth and computational power than conventional motion estimation if the motion compensation mode is field or if the vertical components of the motion vectors are integers. (In the later case there is no vertical half-pel averaging, so only about half of the reference data needed to compute the entire reference macroblock is needed for field F of the reference macroblock.)

Figure 15:
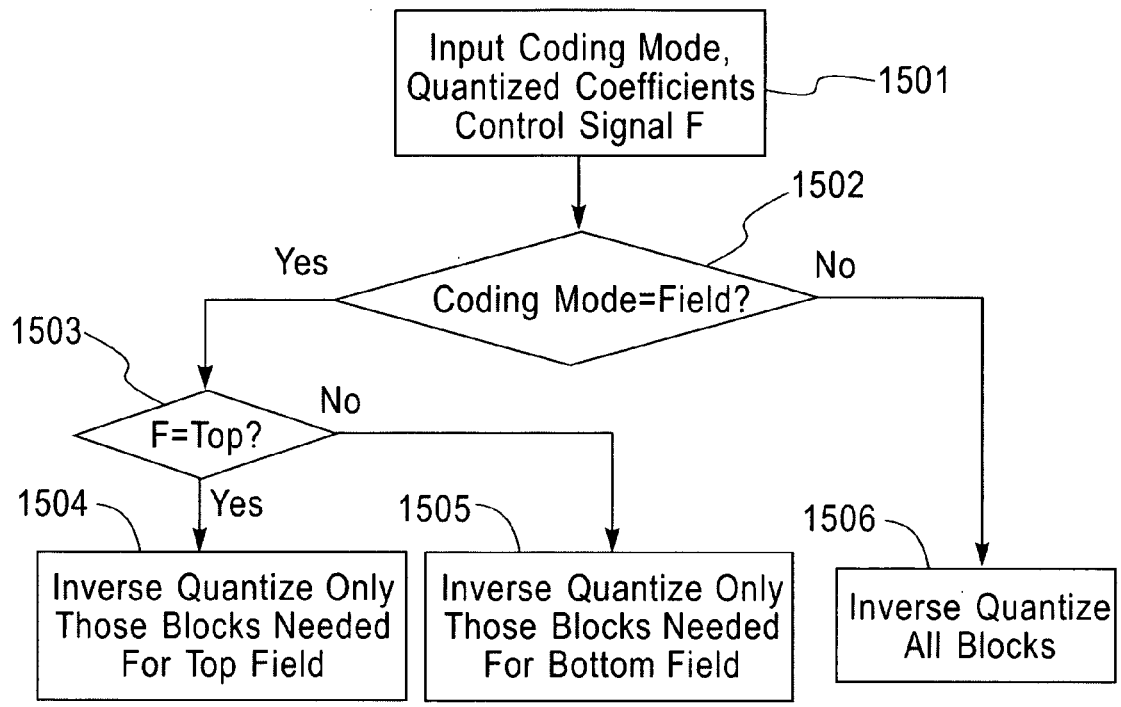
FIG. 15 is a flow chart of inverse quantisation in the decoder of FIG. 13.

In FIG. 15, we have drawn a flow chart for a method for performing inverse quantisation on macroblocks in frame-structured B pictures when the decoding method of FIG. 8 is used. In step 1501, the quantised coefficients and coding mode for the macroblock are input, as is a control variable F. The control variable F is equal to "top" if the top field is being stored to memory, and it is equal to "bottom" if a bottom field is being stored. After step 1501, control goes to step 1502, which checks if the coding mode is equal to field. If it is, step 1503 checks if F=top. If it does, control moves to step 1504, where those blocks needed to reconstruct the top field are inverse quantised. If F is not equal to top, control moves to step 1505, where those blocks needed to reconstruct bottom top field are inverse quantised. If in step 1502 it was found that the coding mode was not field, then control moves to step 1506, where all blocks are inverse quantised.

For inverse quantisation, we were able to reduce the computation (compared to a conventional decoder) if the coding mode is field. For the inverse transform, we will be able to reduce to amount of computation whether the coding mode is field or frame. Before we describe this method, however, we will first describe a conventional method for computing the inverse transform on one block.

Figure 16:
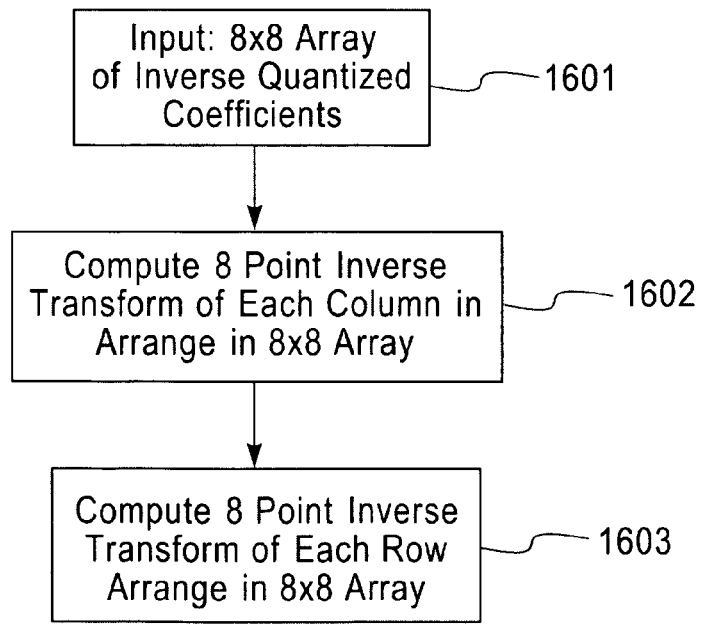
FIG. 16 is a flow chart of conventional inverse transform computation.

This conventional method is called the column/row method, and we have drawn a flow chart of the column/row method in FIG. 16. In step 1601, the inverse transform coefficients are input. Control then moves to step 1602, where 8-point (one-dimensional) inverse transforms are computed on each column, and the data is rearranged back into an 8×8 array. Control then moves to step 1603, where 8-point transforms of each row are computed, and the data is put back into and 8×8 array.

Figure 17:
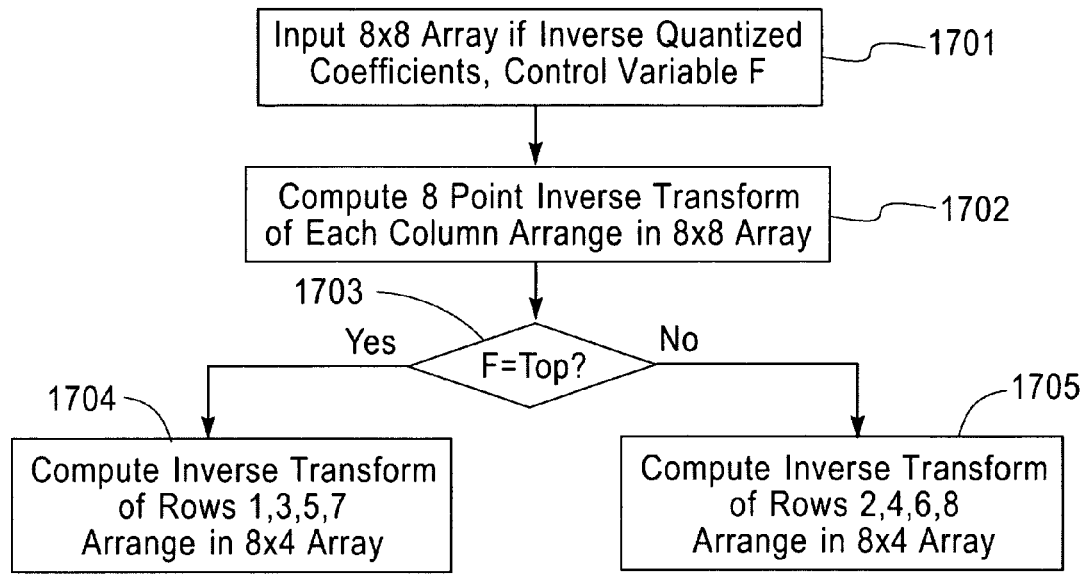
FIG. 17 is a flow chart of inverse transform computation for frame coded blocks in the decoder of FIG. 13.

In certain situations, we will only need to compute the odd rows or the even rows of the output of the inverse transform. In FIG. 17, we have drawn a flow chart for a method for computing only the odd rows or only the even rows of the of the output of the inverse transform. We call this method the "reduced rows" method. In step 1701, the inverse quantised coefficients and a control variable F are input. The control variable F is equal to "top" if the desired output rows are the odd rows, and it is equal to "bottom" if the desired output rows are the even rows. After step 1701, control moves to step 1702, where 8-point inverse transforms are computed on each column, and the data is rearranged back into an 8×8 array. Control then moves to step 1703, which checks if F=top. If it does, control moves to step 1704, which computes inverse transforms on the odd rows. If it does not, control moves to step 1705, which computes inverse transforms on the even rows.

Figure 18:
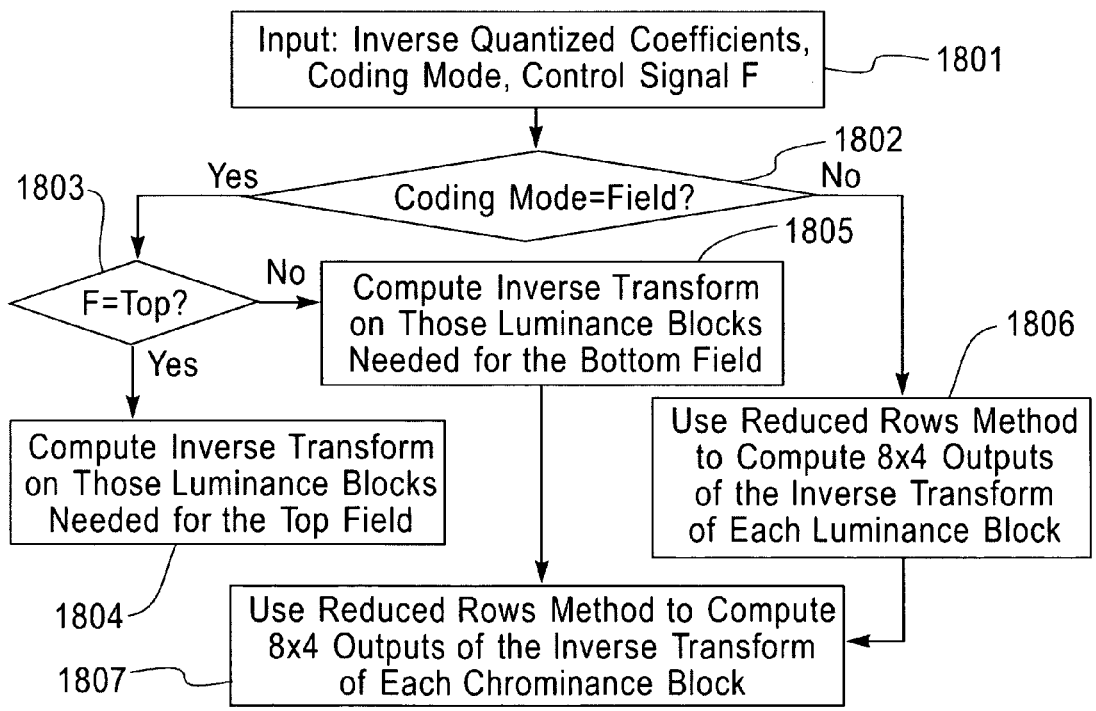
FIG. 18 is a flow chart of inverse transform computation for 4:2:0 data in the decoder of FIG. 13.

In FIG. 18, we have drawn a flow chart for a method for performing inverse transforms on macroblocks in frame-structured B pictures when the decoding method of FIG. 8 is used and the data is encoded in 4:2:0 format. In step 1801, the inverse quantised coefficients and coding mode for the macroblock are input, as is a control variable F. The control variable F is equal to "top" if the top field is being stored to memory, and it is equal to "bottom" if a bottom field is being stored. After step 1801, control goes to step 1802, which checks if the coding mode is equal to field. If it is, step 1803 checks if F=top. If it does, control moves to step 1804, where those luminance blocks needed to reconstruct the top field are inverse transformed. If F is not equal to top, control moves to step 1805, where those luminance blocks needed to reconstruct bottom top field are inverse transformed. If in step 1802 it was found that the coding mode was not field, then control moves to step 1806, where all luminance blocks are inverse transformed using the reduced rows method (FIG. 17); if F=top, only the odd row outputs are computed, and if F=bottom, only the even row outputs are computed. After step 1804, 1805, or 1806, control moves to step 1807, where the reduced rows method is used to inverse transform the chrominance blocks; if F=top, only the odd row outputs are computed, and if F=bottom, only the even row outputs are computed.

Figure 19:
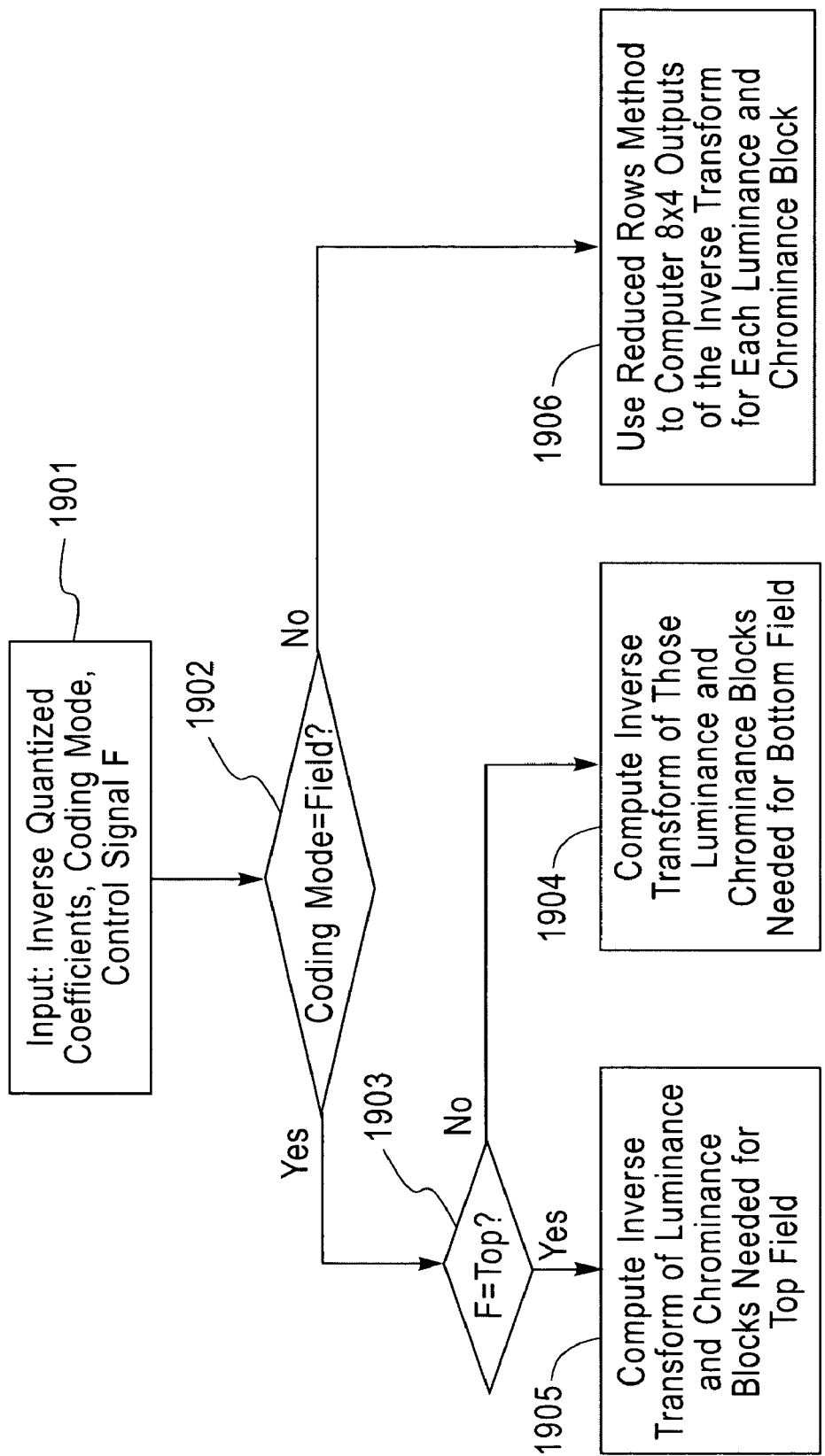
FIG. 19 is a flow chart of inverse transform computation for 4:2:2 or 4:4:4 data in the decoder of FIG. 13.

In FIG. 19, we have drawn a flow chart for a method for performing inverse transforms on macroblocks in frame-structured B pictures when the decoding method of FIG. 8 is used and the data is encoded in 4:2:2 or 4:4:4 format. In step 1901, the inverse quantised coefficients and coding mode for the macroblock are input, as is a control variable F. The control variable F is equal to "top" if the top field is being stored to memory, and it is equal to "bottom" if a bottom field is being stored. After step 1901, control goes to step 1902, which checks if the coding mode is equal to field. If it is, step 1903 checks if F=top. If it does, control moves to step 1904, where those luminance and chrominance blocks needed to reconstruct the top field are inverse transformed. If F is not equal to top, control moves to step 1905, where those luminance and chrominance blocks needed to reconstruct bottom top field are inverse transformed. If in step 1902 it was found that the coding mode was not field, then control moves to step 1906, where all blocks are inverse transformed using the reduced rows method (FIG. 17); if F=top, only the odd row outputs are computed, and if F=bottom, only the even row outputs are computed.

Figure 20:
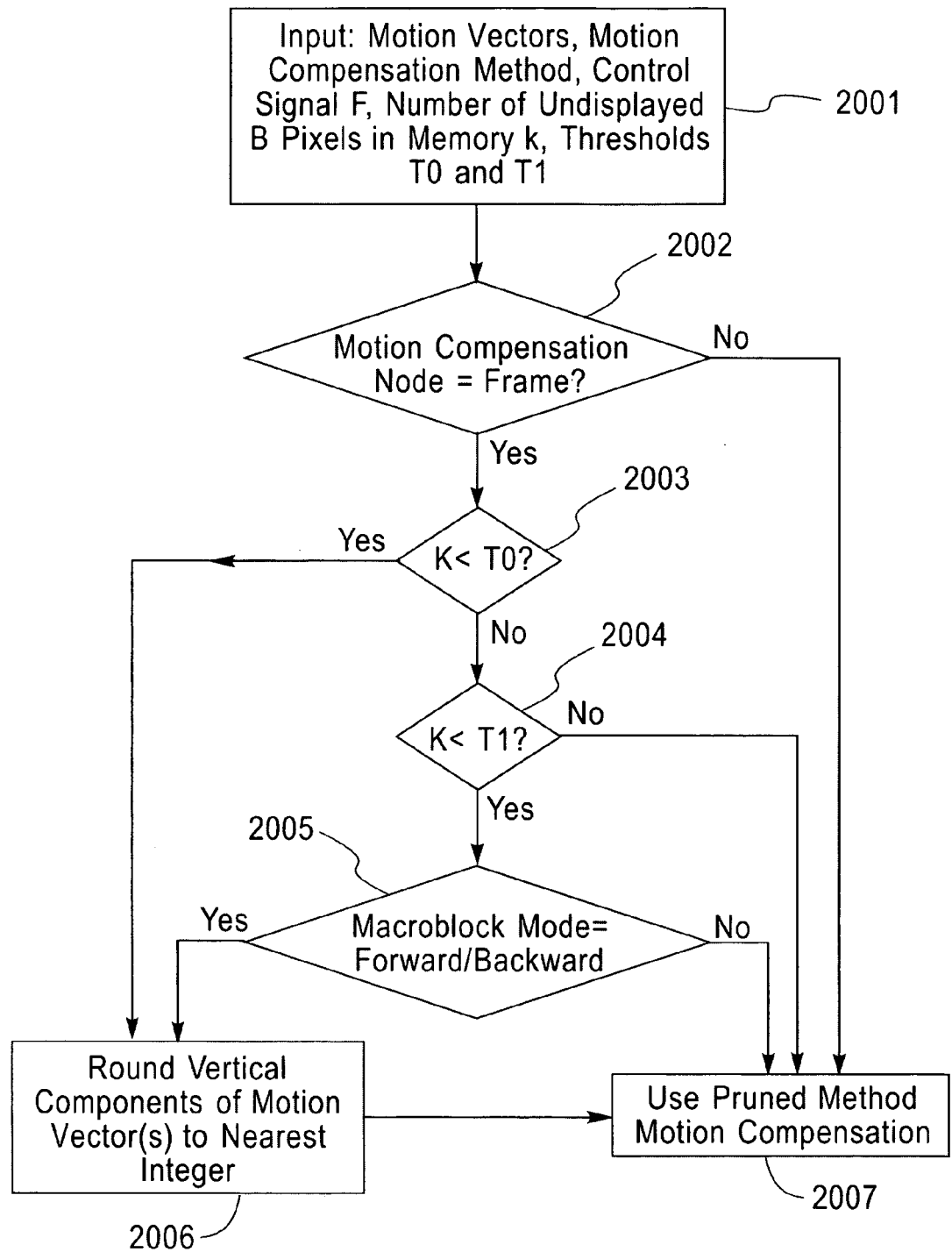
FIG. 20 is a flow chart of approximate motion compensation for use in the decoder of FIG. 13 in accordance with an alternative embodiment of the current invention.

In FIG. 20, we have drawn a flow chart for a method of motion compensation in frame-structured B pictures that is faster then the pruned method of motion compensation (FIG. 14), but will not in general give exactly the same results. (It is therefore appropriate to use this method if a decoder fast enough to use the method of FIG. 8 is not economical and a slight loss in image quality is acceptable.) In particular, the method described by FIG. 20 will round the vertical component of some frame motion vectors if there is a risk of the display getting ahead of the decode. In step 2001, the motion vectors and motion compensation method for the macroblock as well as the k, the number of pixels in the B frame that have been decoded but not yet displayed are input. (By reference to FIGS. 11*a–c*, we can identify k as the number of pixels labeled "y"). Also input is a control variable F. The control variable F is equal to "top" if the top field is being stored to memory, and it is equal to "bottom" if a bottom field is being stored. Also input are two thresholds variables, T0 and T1. After step 2001, control moves to step 2002, which checks if the motion compensation mode is frame. If it is, control goes to step 2003; otherwise, control goes to step 2007. Step 2003 checks if k is less than T0; if it is, control moves to step 2006; otherwise, control goes to step 2004.

In step 2004, the variable k is compared to the threshold T1. If k is less than T1, control moves to step 2005; otherwise, control moves to step 2007. In step 2005, the macroblock mode is examined; if forward/backward interpolation is used, control moves to step 2006; otherwise, control moves to step 2007. In step 2006, the vertical component of the motion vector(s) is (are) rounded to integers, and control then moves to step 2007. In step 2007, the pruned method of motion compensation (FIG. 19) is used.

A large value of k in step 2001 indicates that the decode is fast relative to the display. The pruned method of motion compensation is faster if the motion compensation mode is field than if it is frame. Rounding vertical motion vectors increases the speed of the pruned method of motion by a greater degree if the motion compensation mode is field than if it is frame. For the method of FIG. 20, approximate motion compensation—i.e., rounding of motion vectors—is only done when the motion compensation mode is frame.

Motion compensation is slower when the macroblock mode is forward/backward interpolated than if it intra, forwards only or backwards only. In the preferred embodiment, T0 is smaller than T1. In this case, approximate motion compensation (which is faster than exact motion compensation) is used if either the decode is very slow relative to the display (k<T0) or the decode is somewhat slow relative to the decode (T1>k>T0) and the macroblock uses forward/backward interpolation.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of decoding and displaying a compressed digital video sequence comprising the steps of:
   decoding a picture in the sequence a first time wherein the picture is a bidirectionally predicted picture that contains data from two fields;
   responsive to the decoding the first time, providing a first portion of the picture to a display; and,
   decoding the picture a second time; and,
   responsive to the decoding the second time providing a second portion of the picture to the display;
   wherein the first portion and the second portion comprise different subsets of the entire picture;
   decoding the picture a third time; and,
   responsive to the decoding the third time providing a third portion of the picture to the display;
   wherein at least two of the first portion, the second portion and the third portion comprise different subsets of the entire picture.

2. A method of decoding and displaying a compressed digital video sequence comprising the steps of:
   decoding a picture in the sequence a first time;
   responsive to the decoding the first time, reconstructing only a first portion of the picture;
   providing the first portion of the picture to a display;
   decoding the picture a second time;
   responsive to the decoding the second time, reconstructing only a second portion of the picture; and,
   providing the second portion of the picture to the display;
   wherein the first portion and the second portion comprise different subsets of the entire picture;
   identifying at least one motion vector with a non-integer vertical component; and,
   rounding the odd vertical component of the at least one motion vector to an integer number;
   wherein at least one of the decoding the picture the first time and the decoding the picture the second time comprises the steps of:
   variable length decoding transform coefficients and motion vectors for regions of the picture to produce decoded transform coefficients and decoded motion vectors;
   inverse quantising the decoded transform coefficients to produce inverse quantised transform coefficients;
   performing linear transformations on the inverse quantised transform coefficients for the regions of the picture, to compute correction data for the regions of the picture;
   variable length decoding motion vectors for the regions of the picture;
   computing, from the decoded motion vectors and already decoded pictures, reference regions for the picture; and
   adding the correction data to the reference regions of the picture.

3. An apparatus for decoding compressed digital video information, comprising:
   a compressed data memory;
   a reference data memory;
   a bidirectional frame data memory;
   a repeat decoding decision unit for determining how many times to decode each picture; and
   a decoder connected to receive compressed data from the compressed data memory and repeat decode decisions from the repeat decoding decision unit;
   wherein the repeat decision unit operating in accordance with a set of rules such that it determines that each reference picture should be decoded once, each field-structured B picture should be decoded once, each frame-structured B picture without a repeated field should be decoded twice, and each frame-structure B picture with a repeated filed should be decoded three times.

* * * * *